Dec. 29, 1931.  R. WELCKER  1,838,723
VALVE
Filed Sept. 9, 1929   4 Sheets-Sheet 2

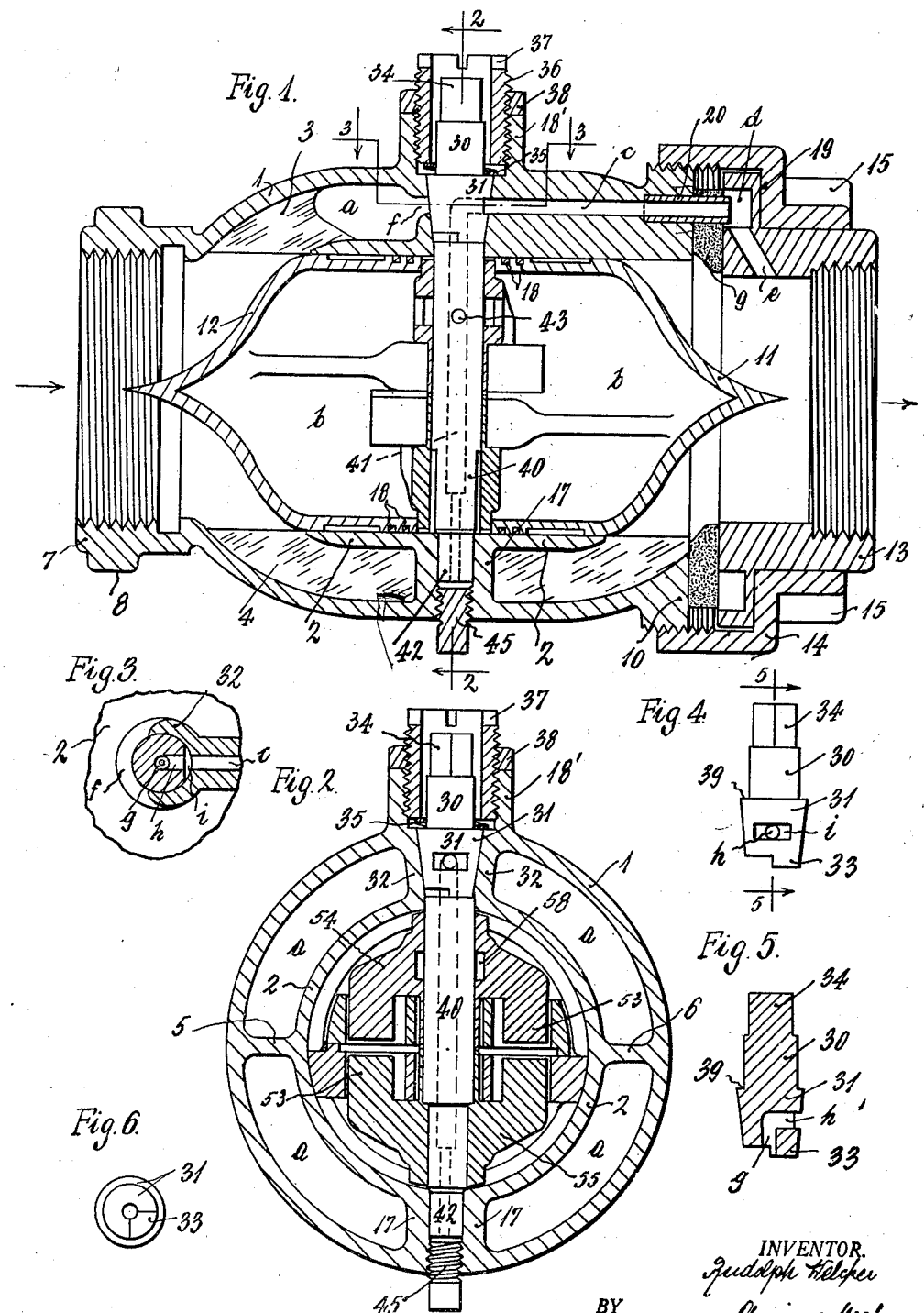

INVENTOR.
Rudolph Welcker
BY
Chapin & Neal
ATTORNEYS.

Dec. 29, 1931.  R. WELCKER  1,838,723
VALVE
Filed Sept. 9, 1929  4 Sheets-Sheet 3
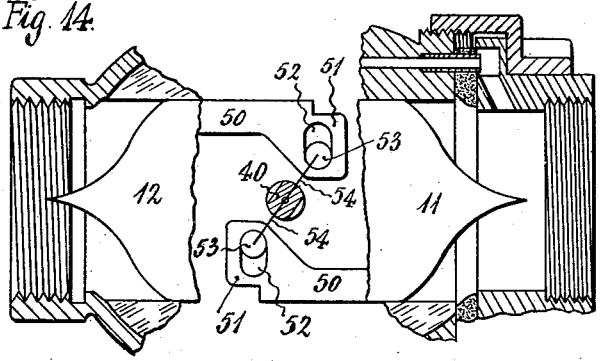
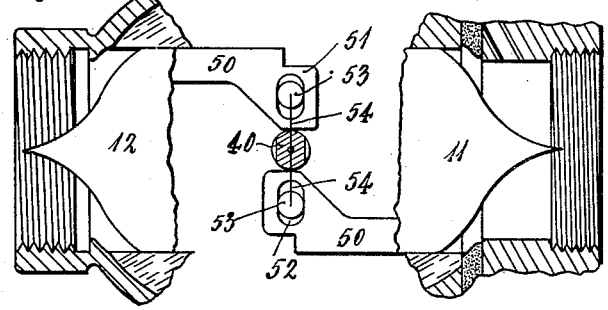
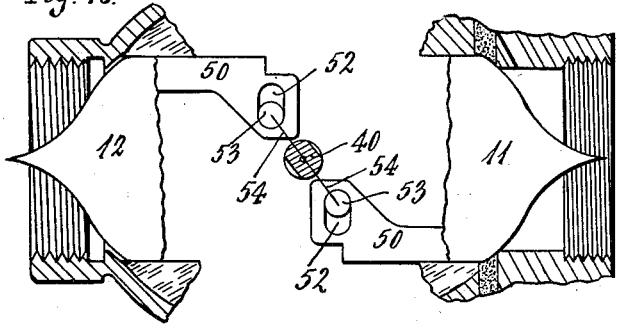
INVENTOR.
Rudolph Welcker
BY Chapin & Neal
ATTORNEYS.

Dec. 29, 1931.   R. WELCKER   1,838,723
VALVE
Filed Sept. 9, 1929   4 Sheets—Sheet 4
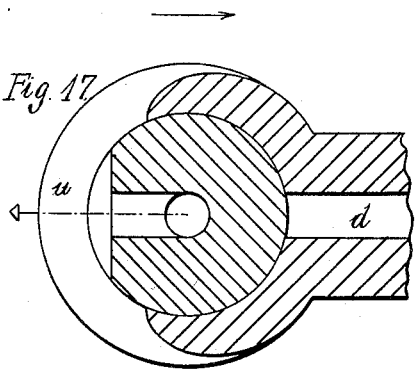
Fig. 17.
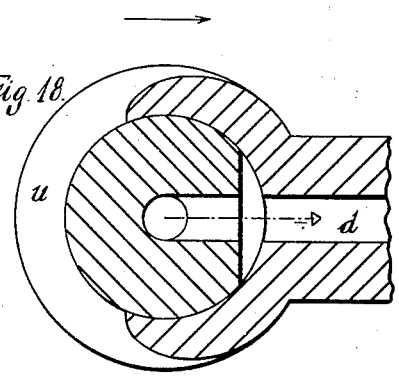
Fig. 18.
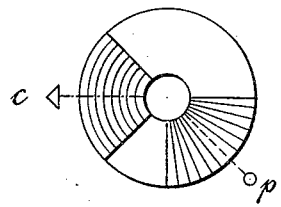
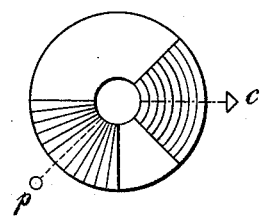
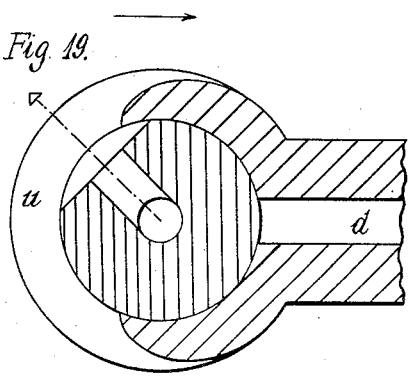
Fig. 19.
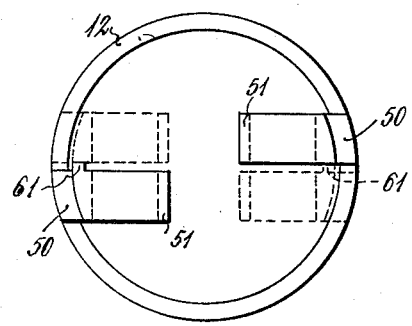
Fig. 8a.
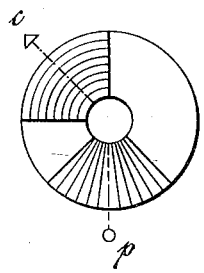
INVENTOR.
Rudolph Welcker
BY Chapin & Neal
ATTORNEYS.

Patented Dec. 29, 1931

1,838,723

UNITED STATES PATENT OFFICE

RUDOLPH WELCKER, OF SPRINGFIELD, MASSACHUSETTS, ASSIGNOR OF ONE-FOURTH TO FRANKLIN G. NEAL, OF SPRINGFIELD, MASSACHUSETTS

VALVE

Application filed September 9, 1929. Serial No. 391,844.

This invention relates to an improved valve for water, air, steam, and all liquid or gaseous fluids. I will describe its simplest form as a water pipe valve. The same structure is fundamentally applicable to both liquid and gas lines.

My valve is operated from the energy in a pipe line and by mechanism to apply such energy to open or close the valve. I believe that my valve structure, mode of operation, and function are in many important respects quite new in conception. These will be pointed out as the broad aspects of the invention. In addition I am disclosing many novel and useful details which may be embodied to advantage in various types of valves, and particularly in a valve like that to be described.

According to one feature of my invention I make a power operable valve that is comparable in cost to a hand operable valve, to a globe valve for example. The idea is to place my power operable valve in the competitive field with valves of the lowest cost types, as globe valves, gate valves, and other well known types, and through the same size ranges from smallest to largest. Because of the operating principles of the new valve that can now be used in the same cost field, the users will get the advantages of an instantaneous operation, of automatically avoiding water hammer, of an automatic closure in case of excessive pipe line velocity, a finger tip control, of an easily maintained tight sealing means, of the absence of packing, of a valve seat adjustable from without the valve casing, of easily replaceable valve seats, and other advantages which will appear.

Another feature of the invention is the means by which my valve parts economize space so as to make it feasible to place my valve in pipe lines at places where prior valves could not be readily accommodated. This feature has utility also in the appearance of the valve, the avoidance of radial protruding material on pipe lines, in getting the valve below the frost line in buried pipe lines, and in other ways which will appear.

To effect many objects of the invention, some of which are related to one another and some not, I have constructed the valve in a special way to eliminate friction in its operating mechanism so as to make it extremely sensitive to the operable changes in the pipe energy.

An additional and important feature of the invention is found in the control means, its structural setting, and its mode of operation, whereby the desired valve operations may be selectively and automatically provided for. My control means, as I will point out, is also arranged for mechanical connection to the valve parts for complete hand operation when desired, but this arrangement is preferably made interlocking with the mechanical setting for automatic operating control. By the interlocking arrangement in the control means the valve cannot be operated by hand except when such operation is aided and not opposed by any hydraulic forces due to the control valve setting. Nor can the valve be operated by power in any way to move the hand operating means. Thus, the same mechanism can be made interchangeably a hand or power operated valve, but never so that one type of operation can oppose the other. The power of selection is available but not the danger of interference. In speaking of hand operation I mean to include any operation by energy from without the valve casing, as by a magnet remotely controlled. Such a device may be a substitute for the hand in working the valve or the easily operable control means in either of the two ways described.

The above purposes of my invention will be clearer from the detailed description of its preferred embodiment. From the latter it will also be clear that the invention is peculiarly available for use in special engineering designs for hydraulic or gas valves of very large size. In a real sense my valve parts are arranged for automatic balancing operations which wipe out, by exhausting, the destructive hydraulic or gas pressure forces in the work of operating the valve and this feature makes the valve applicable with important engineering results in many special uses in power lines.

The drawings show a two-inch valve of my preferred construction, such as would be sold in stock sizes.

In the drawings—

Fig. 1 is a longitudinal cross section taken centrally through the valve with all parts assembled. The control cock and aligned shaft are arranged in place vertically and shown in side elevation rather than in section. The arrows in this view show the direction of the intended stream flow for the relative ports of the valve;

Fig. 2 is a transverse cross section on line 2—2 of Fig. 1 but with the parts aligned with the control cock shown in front elevation;

Fig. 3 is a detail sectional view on line 3—3 of Fig. 1 through the control cock, including its casing walls, to show the relation of its ports;

Fig. 4 is a front elevation of the control cock and its stem without its casing walls;

Fig. 5 is a section on line 5—5 of Fig. 4;

Fig. 6 is a bottom plan view of the control cock as shown in Fig. 4;

Fig. 8a is an end detail view of the plunger heads with parts removed;

Figure 7:
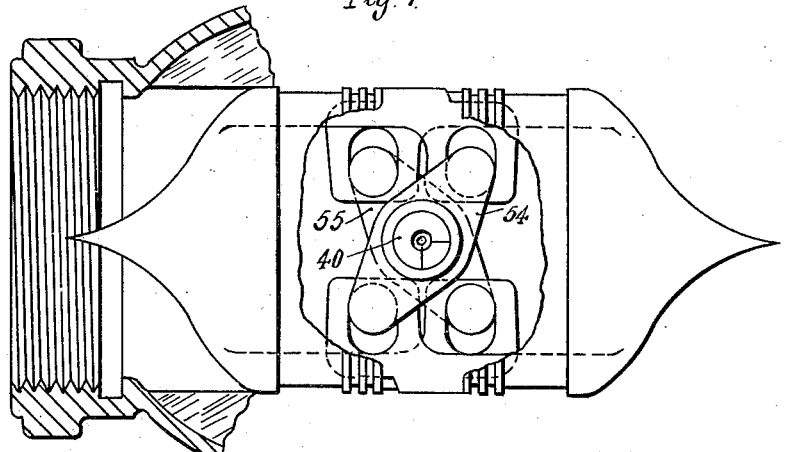
Fig. 7 is a detail view with parts broken away and part in section to better show some of the valve mechanism. This view in comparison with Fig. 1 shows the parts from a difference in angle of 90 degrees or from above with respect to Fig. 1.

Figs. 14, 15, and 16 are detail schematic views indicating respectively the wide open, partially open, and full closed position for some of the valve parts; and Figs. 17, 18, and 19 are schematic illustrations of various cock positions.

With reference to the drawings a brief enumeration of the main functional members of the structure will be given first and then a detailed description of the individual members. Finally, the operation of the valve under various operating conditions and the advantages connected therewith will be discussed.

Structure

The valve body or shell 1 has a terminal neck portion 7 at its upstream side and a terminal truncated portion 10 at its downstream side, the former interiorly and the latter exteriorly screw threaded for the reception of the ends of the pipe line directly at the neck side and indirectly by means of an interposed neck assemblage at the truncated side with all parts so arranged that the valve fits between the pipe connections in coaxial alignment therewith and forms, as it were, a somewhat wider section of the line. Within the shell and concentric with it by means of axially disposed connecting ribs 3, 4, 5, and 6 a cylinder 2 is held at a distance from the inner shell wall so as to provide a sufficiently wide concentric fluid channel $a$ between the two parts. About midway between the neck portions a round conduit diametrically piercing the shell and the cylinder walls is formed between bifurcated rib portions, as shown at 17 in Fig. 1 and at 32 in Fig. 2. The latter portion is conically widened and extends in a cup 18' on top of the valve body. All portions, as described heretofore, are preferably made as a single casting except the interposed neck assembling at the downstream side.

The diametrical conduit serves as a bearing for a spindle 40 to which spindle two oppositely arranged cup-like pistons or plungers 11 and 12 are anchored. These plungers are axially movably guided within the cylinder 2 and sealed against fluid and pressure access to their interior by means of piston rings 18 so that an axially expansible and contractible chamber $b$ is obtained in the center of the valve body. As will be noted from the the drawings, these plungers have a peculiarly pointed form for reasons to be given later. When expanded, their external surfaces are generally adapted to seal the seats of the valve in or near the neck portions; however, the anchorage of the pistons to the spindle is such that only the downstream piston 11 will seal tightly while the upstream piston 12 leaves a sufficient leak between itself and the conforming neck portion to admit at all times an access of the full upstream pressure to the fluid channel in the valve.

A cock 31 arranged in the upper portion of the diametrical conduit permits, according to its position, communication of the chamber space $b$ either with the fluid channel $a$ or the downstream side of the valve through a narrow conduit $c$ within the top rib 3. This conduit $c$ opens into a narrow annular channel $d$ near the downstream neck portion, which channel communicates with the downstream side beyond the valve seat through a number of circumferentially disposed holes $e$.

From the above general description of the main functional parts of the structure, it is apparent that various pressures can be transmitted to the chamber space $b$ and that these interior pressures in coaction with pressures acting upon the exterior plunger faces and varying under different operating conditions may produce differential pressures for expanding or contracting the chamber or closing and opening the valve.

A detailed description of the various members of the structure will now follow.

The upstream integral neck portion carries on its outer periphery a number of bosses 8 to facilitate attachment of the valve to the pipe line by means of a wrench engaging those bosses. Since the upstream plunger never tightly seats in this neck portion, no machining for a seat at this neck end is required.

The downstream truncated valve portion terminates in a face that is accurately machined in a plane normal to the axis of the valve. Against this face the separate annular seat member 9 is pressed by means of the separate neck extension 13, which latter is kept under axial thrust within a sleeve or bushing 14. In screwing this bushing down on the valve body, all angular movement will be taken up by slip at the smooth contact faces 19 between the bushing and the neck and, thus, the seat member receives only axial pressures. This arrangement is especially desirable in cases where the seat member consists of highly flexible material such as rubber which will easily stand comparatively high pressures but would suffer and become distorted under shearing forces. Preferably the seat has yielding, elastic properties, such as certain rubber compositions offer, in connection with other valuable qualities. If such a seat changes its form under prolonged operation of the valve, it can easily be adjusted again from outside by further tightening the bushing 14 by means of a wrench engaging a plurality of radially disposed ribs 15 on the bushing. Also, if it is desired to renew or replace the seat, the work involved with my structure does not require any disassembling of the valve or complete disconnecting from the pipe line. But instead, by unscrewing bushing 14 and pulling it a little backwards with the pipe end, the annular seat can easily be removed and replaced by lateral insertion. This feature of utility I consider of substantial importance apart from the other features of the valve because it renders the proper maintenance of the valve seat easy and inexpensive. The seat shown at 9 has a small axial hole in one place to receive a short bushing 20 as connecting conduit between the downstream cock conduit $e$ and the annular channel $d$ with the cored passage $c$.

The housing for the cock 30 (see Figs. 2 and 3) is formed in a bifurcated portion 32 of the upper rib 3. A slot shaped port $f$ extending semi-peripherally at the upstream side of this housing provides access from the fluid channel $a$ to the cock 31, while the narrow cylindrical conduit $c$ forms a small round cock port at the downstream side. The cock has a central bore $g$ (Figs. 3 and 5) and a radial bore $h$ in communication with each other. Symmetric with bore $h$ a segment $i$ is cut from the cone. A sector of the lower tapered end of the cock cone (see also Fig. 6) is continued as a projecting lug 33. The upper non-seated cock stem 30 merely serves to provide by its angular extension 34 a suitable engagement for a handle. In order to hold the cock with proper pressure down in its housing, a spring washer 35 is pressed against the shoulder 39 of the cock cone by screwing down the bushing 36 within the threaded cup 18' by means of a wrench fitting the upper angular end 37 of the bushing. The whole assembly is then locked in position by the nut 38. In this way, fluid is prevented from leaking past the cock while, according to the position of the cock, pressures may readily be transmitted underneath the bottom face of the cock through its conduits $h$ and $g$. These pressures would, except for my construction, cause the cock to leak. Whatever these pressures are I can tighten the cock to oppose them and at the same time maintain the easy operation of the cock. This arrangement I believe to be entirely novel.

The spindle 40 also shown in various detached figures, 9 to 12, serves a plurality of purposes which are: first, the transmission of pressure from the cock housing, that is, from underneath the cock to the central pressure chamber $b$ of the valve as formed by the plungers and their common cylinder; second, to afford an anchoring post for the plungers; third, to transmit manual forces applied to the cock to the anchoring links and thereby to the plungers for operating the plungers by hand, if so desired.

Figure 9:
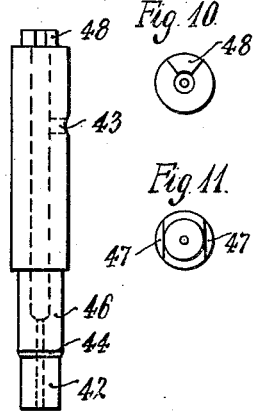
Fig. 9 is a side elevation of the shaft aligned in the assembly with the control cock.
Figure 11:
Fig. 11 is a bottom view of the shaft.

The first function, that is, the transmission of pressures from the cock housing, is performed by a central axial bore 41 (see Fig. 12) which pierces the whole length of the spindle. The spindle is journaled at its upper end in the lower portion of the cock housing and at its lower reduced end 42 in an enlarged portion 17 of the lower rib 4. I prefer to hold the spindle with a certain play in these two bearings. The pressures are transmitted through one or several radial holes, such as shown at 43 (Figs. 9 and 12), which holes communicate with the central bore of the spindle. In vertical direction, the position of the spindle is secured by a shoulder abutment 44 in its lower portion, which abutment extends only over two sector portions of the spindle (see Figs. 9 and 11), and thus leaves outlets between the sectors for pressures underneath the lower face of the spindle to escape past the bearing to the interior of the cylinder. It will be noted from Figs. 1 and 2 that for convenience of manufacture the lower spindle bearing is led through to the valve exterior and then sealed by means of a screw-threaded plug 45. It is evident now that pressures underneath the cock have no other chance but to escape to the central chamber.

The plungers are anchored to the spindle in such a manner that any axial displacement of one of the plungers produces by mechanical constrainment an equal axial displacement of the other plunger in the opposite direction or, in other words, the expansion and contraction of the chamber is bilateral and symmetric with respect to a plane, normal to the valve axis where this axis intersects the spindle axis.

This constrained joint displacement of the plungers is secured in the form shown by attaching the plungers to a double-arm lever of equal arm extensions, which lever may be rotatably or non-rotatably mounted on the spindle. In Figs. 14, 15, and 16, the mechanical principle is schematically illustrated. The positions of the plungers in these figures are represented in the order of completely contracted, half-expanded and completely expanded condition, corresponding to the valve functions wide-open, half-open, and closed. As it appears from these figures, the two plungers are provided with identical anchoring studs 50 (each stud preferably made in the same casting with its plunger) which terminate in a recessed lug portion 51, the recess being sufficiently wide to permit the entering of this portion in the interior of the opposite plunger in the contracted position of the plungers. Oblong holes 52 in the lugs receive pins 53 integral with and projecting from the double-arm lever which is only indicated by its axis 54. It is obvious that when the lever rotates about the axis of the spindle 40, the plungers are constrained to perform along their common axis symmetric and opposite movements with respect to the spindle axis. The engagement between the lever pins and the lugs is sufficiently loose to prevent any jamming, and the oblong shape of the lug holes provides for the necessary lateral movement of the lever pins. As can be seen by comparing Fig. 14 and Fig. 16, the total angle swept through by the lever during transition from completely contracted to completely expanded relation of the plungers amounts to about ninety degrees or, referred to the middle position shown in Fig. 15 as zero position, complete opening of the valve corresponds to an angular displacement of the lever of about 45 degrees in one direction, and complete closure to about 45 degrees displacement in the opposite direction. These angular arrangements are shown for purpose of illustration and of course may differ in other designs of the same kind of valve.

Figure 13:
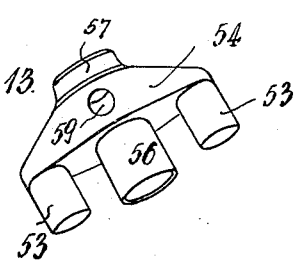
Fig. 13 is a perspective view of one of the two rocker arm levers which pivot on the shaft. The one shown is the upper of the two disclosed partly in section and pivoted on the shaft in Fig. 2.

Though a single lever arm would answer the purpose of producing the desired constrained movement, I have shown a double lever arrangement of substantially identical levers, one arranged above the other and each registering with a pair of identical lugs because such an arrangement may exclude jamming. The double-arm levers used in my present design are shaped as shown in Fig. 13. The cast piece comprises the arm portion 54 with two projecting pins 53 for engagement in the plunger lugs and a bearing in its center extended at one side of the arm in a longer sleeve 56 and at the other side in a shorter collar 57. One of the two levers employed in my structure has a circumferential groove 58 in its bearing surface, as can be seen in the upper lever 54 of cross-section Fig. 2. This groove communicates with the exterior by means of a hole 59 in the arm (Fig. 13). The previously mentioned radial hole 43 in the spindle is vertically so disposed as to open into the groove 58 whereby an unrestricted pressure conduit is created from the cock housing following the axial spindle bore, the radial spindle hole, the groove, and the hole 59 in the lever arm 54 out into the cylinder space b. This upper lever arm 54 is rotatable about the spindle. However, the lower lever 55 (see Fig. 2) is rigidly mounted or keyed on the spindle. At an intermediate portion 46 (see Figs. 9 and 11) the spindle has been reduced by cutting off two oppositely disposed segments 47, and the straight faces thus formed on the spindle lock the lever in fixed relation to the spindle by snugly engaging corresponding faces protruding from the bearing surface of this lower lever arm.

The spindle has at its upper end a protruding sector portion 48 like the one at the lower end of the cock. After the spindle and the cock have been properly mounted in place, the sector portions of the cock and the spindle will be co-extensive in vertical direction and consequently cannot overlap in the plane of their common circle. But, if the cock is sufficiently turned one way or the other, the cock sector will finally engage the spindle sector by lateral abutment and thus impart a rotary displacement to the spindle one way or the other with the effect that the lower lever arm turning with the spindle either expands or contracts the plungers in their relative position. In this way, it is possible to close and open the valve by turning the cock.

Figure 8:
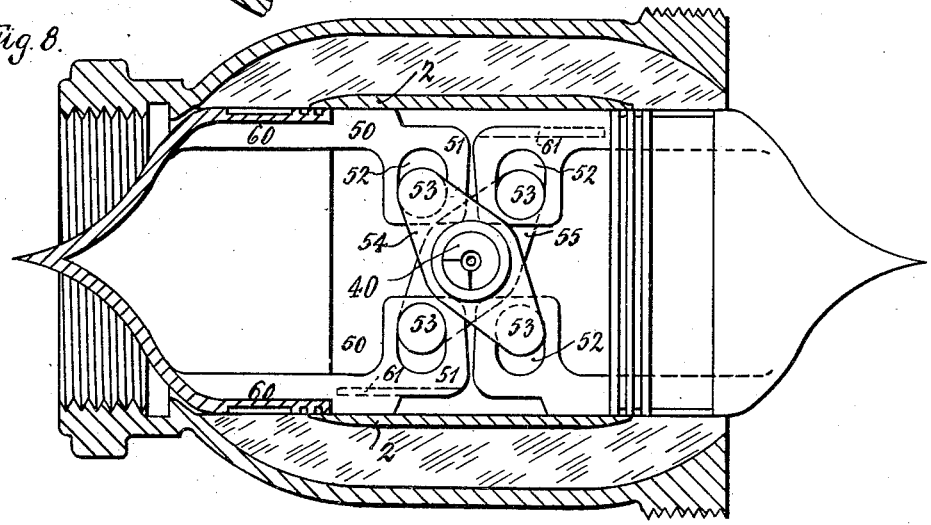
Fig. 8 is a view like Fig. 7 but with more of the valve casing shown and with the valve parts in closed instead of open position.

It will be noted from Fig. 2 that the two levers 54 and 55 are oppositely arranged with the pins of the lower lever upstanding and the pins of the upper lever depending. This disposition permits of a perfectly identical design for the two plungers and their anchoring studs. Figs. 7 and 8 show the arrangement in top plan view, the first figure for completely contracted and the second for completely expanded condition.

As can be seen from the left cross-sectioned plunger in Fig. 8, the anchoring studs are an extension of longitudinal reinforcement ribs 60 in the interior of and integral with the plunger. The intermediate portions 50 of the studs are ground down to a diameter that will provide a snug fit in the bore of the cylinder 2 and thus assist in accurately guiding the plungers within the cylinder. The terminal lug portions 51, due to their receding from the cylinder walls, are plunged in the interior of the oppositely arranged piston when the pistons are contracted, as shown in Fig. 7. The relation of the anchoring studs in contracted position requires that the studs be circumferentially unevenly spaced. Viewed from the open plunger side, Fig. 8a shows in full lines the disposition of the studs in the plunger exposed to view, while the finely dotted lines indicate the position of the lugs of the other plunger back of the spectator if the two plungers are supposed to be in their proper assembled relation. The advantage of this arrangement is that the two plungers are identical in shape so that they can be cast in the same mold. One of the studs of each plunger has a small projecting rail portion 61 (Fig. 8a), the face of which may be machined so as to provide an accurate sliding engagement between the two pistons. The necessity of making the holes 52 in the lugs oblong in order to provide for the lateral movement of the pins 53 during their turn about the axis of the spindle has been pointed out already.

By making the complete travel of the downstream plunger between wide-open and tightly closed position somewhat shorter than the distance which the constraining mechanism would allow, the upstream plunger is prevented from seating in the valve body and from interfering with a perfect closure of the downstream plunger.

As pointed out already, the spindle is loosely journaled in its bearings, and the play obtained thereby will assist in tightly sealing the valve, since the whole chamber structure will be displaced a little in the downstream direction, if this should be desirable, for instance, when the elastic seat has yielded somewhat under prolonged operation and not been readjusted yet in the manner described above.

The employment of a separate seat element of elastic properties is a great advantage of this valve structure over others where the seat must be accurately machined on the valve body itself, a work which is often very difficult and requires much precision with correspondingly high cost of labor. In most cases suitable seat materials for different fluids such as water, oil, saturated and superheated steam, various gases, etc. are available in the market; but even if it should be necessary to go over to a metal seat the advantage of machining separate members of simple form as compared to the machining of a complicated and heavy valve body is manifest.

Figure 12:
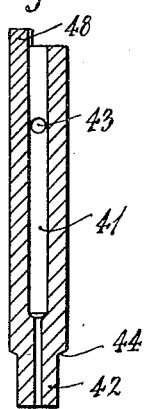
Fig. 12 is a longitudinal cross section of the shaft.

Now that the structure has been described in considerable detail, it can be summarized in a more general description. There is the single casting which includes the valve casing or shell 1, the open ended cylinder 2 spaced by webs 3, 4, 5, and 6, the bearings for the spindle and the control cock seat. There are the two identical castings, each of which makes a plunger or piston head for the cylinder 2 and integral with anchoring lugs 50 for connection to the rocker arms 54 and 55. There is the spindle mounted transversely of the valve having its various features preferably in a single piece, as shown in Fig. 12. There are the two substantially identical castings 54 and 55, making up the rocker arms, mounted on the spindle as a rocking support and each having its ends pivotally connected, one to one of the plunger heads and one to the other plunger head, and with the respective connections reversely arranged as between the two rocker arms. These mechanical connections between the rocker arms and plunger heads are made in quite a loose jointed manner to prevent binding and avoid friction. There is the control cock particularly situated with regard to its associated passages.

It is believed that from the purely mechanical standpoint the mechanical arrangements and possible movements will now be quite clear. If anything moves one of the plunger heads in one direction, the pivoted rocking arms and their connections require the movement of the other plunger head in the opposite direction. The turning of the control cock may be made to, but does not necessarily, move the plunger heads one way or the other. The whole arrangement is generally symmetrical and balanced and, except for the very small control cock operating means, nothing protrudes from that valve casing form desired for a stream line flow. By reason of the arrangement of the mechanism within the valve casing, particularly in the pressure cylinder, substantial results in space economy are effected. This makes it possible to manufacture my valve in small sizes and to secure other mechanical advantages.

The assembling and disassembling of the valve is very easily carried out and, therefore, requires but little time. In order to assemble the valve, the two pistons are placed in the position described in connection with Fig. 8a, and the pins of the two rocker levers are then inserted in the corresponding lugs. This preliminary assembling lends itself very readily for the introduction in the valve cylinder from the downstream valve opening. After the proper angular relation with respect to the spindle axis has been adjusted, the spindle is inserted through the cock housing. The assembling of the remaining parts comprises only obvious and quite common manipulations. By withdrawing the spindle from the valve, the pistons can be made to slide automatically out of the shell and, in this way, the valve will disassemble in its various parts without further manipulations.

The automatic operations of my valve will now be described. It will be assumed that the closed valve is in a water pipe line under a hydraulic head, but it should be understood that its principles of operation would also apply in air, gas, or steam lines—that is, in liquids or gases, hot or cold.

To open the valve, I turn the control cock to the position shown in Fig. 18. This opens communication from the pressure space $b$ (Fig. 1) through opening 59 (Fig. 13), groove 58 (Fig. 2), opening 43 in the spindle, bore 41 (Fig. 12), passages $g$ and $h$ in the control cock, passage $c$ in rib 3 (Fig. 1), groove $d$, and openings $e$, to the low pressure side of the valve beyond valve seat 16. Such communication releases the pressure in space $b$ which has been holding the plunger heads towards their seats. Upon the release of this pressure, the hydraulic head presses plunger 12 to the right (Fig. 1) and plunger head 11 is pulled open, to the left.

As the water flows through the annular space between the valve casing 1 and pressure cylinder 2 and again comes to a solid stream beyond plunger nose 11, there is a suction tendency to pull plunger 11 closed. Since the direct pressure on plunger 12 has a greater force to push it open and it is connected to plunger 11 to move the latter in the opposite direction to plunger 12, the consequence is that plunger 11 is pulled open. Since both plungers must move together, one acts as a "damper" or check on the other in all operations, and the opening action, for example, is a gradual easy movement with a substantial result in checking water hammer action in the pipe line.

To close the valve, I turn the control cock into the position shown in Fig. 17. This makes communication directly from the stream flow to the pressure space $b$ exactly as a Pitot tube would be used to connect a pressure space in measuring the velocity head of a stream flow. The pressure of the velocity head is trapped in space $b$ exactly as it would be trapped in an expansible measuring instrument if one were measuring such head. But in my valve the presure in space $b$, due to the velocity head, instead of being used for measuring is used to push plunger heads 11 and 12 towards their seats. My particular structural arrangement makes it possible to do this even with a much lower velocity head than would ordinarily be thought feasible.

It will be understood that my pressure valve is operated by manipulating and applying different pressures from different regions of the stream flow rather than by any reliance on differential areas of the parts to which the pressures are applied. The latter is a rather common expedient in automatic valve operation, but is not used in the preferred form of my valve. In my valve, for example, the parts like the plunger heads are preferably of equal area and substantial images of each other but differently arranged so as to be exposed to different pressure regions. This feature, among other advantages, enables me to make the diameters of the plunger heads smaller than would otherwise be the case and the advantage is that they can be made the same size as the actual pipe line in diameter in which the valve is placed. This results in a small and lightweight valve in relation to the pipe line. The plunger head on the high side of the valve is subjected to quite different pressure conditions than the one on the low side and it is this feature that causes the operation of one by the other.

By placing my control cock inlet between the two pressure regions or preferably midway of the positions of the plungers and directly in the stream flow, I get these advantages. The passage to the pressure chamber $b$ is short. Fricton loss is minimized and the velocity head is made most effective while the passage is under control from without the casing by simple means and without any mechanical complications. As I will now explain in connection with an intermediate setting of the control cock, the position of the latter has special relation to one automatic operation of the valve, which is an emergency operation.

It is desirable in many instances to have means in a pipe line which will keep it open for all normal velocities but which will stop the stream flow entirely whenever the velocity exceeds a critical figure. In my valve, this is provided for by an intermediate setting of the control cock in relation to the operating principles of the valve. For example, the setting of the control cock shown in Fig. 19 will bring about the emergency closing of the valve on a certain excessive velocity head, and so will other settings between that shown in Fig. 17 and Fig. 19. The setting of Fig. 19 is taken as an illustration at 45°. In this position of the control cock with the other parts as shown in Fig. 1, the action is as follows: At all normal velocities below the critical one, determined by the particular control cock setting, the valve remains open. It so remains because the full value of the velocity head is not applied through the control cock to the pressure chamber $b$. If it were, the valve would close. By reason of the kind of setting shown in Fig. 19, a selected fraction only of the full velocity head is applied through the control cock to the pressure chamber. Such fraction is determined by the angularity of the cock inlet port. When the angle of this entrance passage is changed from its parallel relation with the port exactly facing the stream line flow to one at an angle, the velocity impact is definitely decreased. There is then a chance for the water to slide by without delivering its full blow on the entrance passage. The action might be imagined as the same kind as when a blow is applied in one direction against a plane inclined at an angle to the direction of the blow. This principle of operation is quite a different one than where the control passage for the velocity head pressure is throttled to change its value. The latter is workable but in my preferred form of valve I emphasize the difference in principle above described as one of the features of my control because its application has many advantages which I will not try to enumerate now.

When the control cock is thus set to take only a fraction of the velocity head value, it is true that the valve remains open unless the velocity exceeds a critical amount, predetermined principally by the angle of setting. If and when the velocity of the flow exceeds this amount, that excess pressure which is transmitted to the pressure chamber is, in conjunction with the pressures on the exterior of the plunger heads, sufficient to give the emergency closure for the particular setting.

In my description of the operation, it may be thought that the force which closes the valve is an increased force within the pressure chamber $b$ due to the increased velocity head. But I do not believe this to be the case. And the best explanation in hydrodynamics is probably quite involved. According to my understanding, there is in any pipe line with a given hydraulic head a substantially constant pressure within space $b$ if my valve is inserted in that line since the sum of the static and velocity head must be equal. This so-called constant pressure in space $b$ is changed only by changing the setting of the control cock. So when I set the latter at 45°, for example, from its position in Fig. 1, it makes a new pressure value within space $b$. But for that setting (or any other angular upstream setting), I conceive the pressure in space $b$ as substantially constant and its amount determined by the angle, whatever the velocity in the line may be. With a substantially constant pressure in space $b$, it is, according to my conception, the decrease in static head pressure on the outside of space $b$, upon an increase in velocity causing a diminishing pressure on the exterior faces of the plunger heads, which enables the pressure in $b$ to close the valve as I have described it. Whatever the explanation may be, however, I have by trial found that the valve does close whenever the critical velocity head determined by the cock setting is exceeded. This results in the emergency closure of the valve.

As I have shown the present valve structure, it remains closed under the above described action until the control valve is reset to open it.

The large advantage in the operation just described is found in the safety feature. When abnormal conditions of high velocity start to operate (as by a break in the pipe line on the low side), my valve, which is normally used for opening and closing the line, will also act as a safety stop and will keep the line closed until deliberately reopened. In many cases, as in a line break, it is not sufficient to merely keep the velocity down to normal, as a governor action would do, because that would still waste a lot of liquid. My valve will stop that kind of waste.

My valve may also be used in duplicate form, one for operations at one point in the line (as previously described) and one spaced in the line at a distance but set in the reverse direction with the tight valve seat (Fig. 1) upstream. That is, in the second valve with the valve shown in Fig. 1 turned 180° in the line and so the stream flow through the valve is in the opposite direction with relation to the parts shown in Fig. 1. The pipe line is then sectionalized between two such valves. One will operate as I have already described; the other, set in open condition, will have no effect with the stream flow in the normal direction; but if (for example) a break occurs between the two valves, they will both close as a velocity head will be directed toward the break from both directions, and they will remain entirely closed until re-set.

From the foregoing description it will be seen that I have provided a power operated valve operable directly from the impact of the stream line flow to open and close the valve and to also serve as an emergency stop in a power flow.

Figure 10:
Fig. 10 is a top view of the same shaft.

It may be desirable now and then to operate the plunger heads by hand as when the pipe line is empty and one wants to close or open the valve. To do this, I have provided the sector lug 33 (Figs. 5 and 6) on the bottom of the control cock which may be turned to abut one side or the other of the sector lug 48 on the top of the spindle (Fig. 10). It will be remembered that the spindle is keyed to rocker arm 55. These sector lugs are arranged so that the control cock may be turned without their engagement to full valve open, full valve closed, or to the intermediate angular positions mentioned for an emergency stop. The sector lugs 33 and 44 are angularly placed so that the control cock can be normally set to any of the desired positions as if the lugs were not there. When it is desired to close the valve by hand or extraneous means, the control cock is turned until lug 33 engages lug 48, whereupon a continued turning will apply force to the spindle and turn that and the rocker arm 55, for example, to open the valve by hand. The lugs are so placed that if there are any hydraulic forces available to open the valve at the same time the hand operation is going on, they will assist the hand operation. Thus when the lugs engage for opening, the control cock port has access to passage c (Fig. 1) during the whole of the angular movement necessary. This is provided for by the cutaway portion i (Fig. 3) which overlaps the entrance to c throughout the angular movement. The same is true with respect to port f (Fig. 1) when the control cock is turned way around to engage the lugs 33 and 48 at the opposite sides for closing the valve by hand. The hand power can thus be applied to open or close the valve, but it is never possible for the control cock to be turned by the spindle taking its movements from the rocker arm and plunger head. In other words, connection for movement is irreversible, the parts being interlocked to prevent any interference at any time between the hand and hydraulic power.

What I claim is:

1. A valve construction comprising a casing with aligned ports, a coaxial pressure cylinder having reciprocable heads, valve seats in the aligned ports, mechanical means within said cylinder to connect said heads for the movement of one to force the movement of the other in the opposite direction, and each toward or from its adjacent valve seat, control means to direct fluid pressure to and from said cylinder as desired, said cylinder heads, mechanical means and valve seats all constructed and positioned so that one head may reach its valve seat and make a tight closure while the other head is still a slight distance from its seat, whereby a cylinder pressure tending to move both heads to their seats may act directly on the first seated head as well as indirectly through the other unseated head and said mechanical means to constantly and flexibly hold the seated head tight.

2. A valve construction comprising a casing having aligned inlet and outlet ports, a pressure cylinder spaced from the casing and having reciprocable heads aligned with said ports, for controlling fluid passage therethrough, rocker arm mechanism within the cylinder and connected with said heads so that they must move in opposite directions, a control means for admitting fluid pressure from the stream flow to said pressure cylinder, said means including a Pitot tube arrangement to apply velocity head pressure for the operation of said cylinder heads in closing the valve.

3. A valve construction comprising a casing, a pressure cylinder spaced from the casing to make an annular stream flow through the valve, pressure operated valve manipulating mechanism within said casing, a control means for said mechanism including a passage wholly within the casing and connecting to the stream flow at different pressure points and to the cylinder intermediate its ends, a control valve in said passage where it leads to the cylinder and operable to connect the cylinder through said passage with a Pitot tube inlet facing the upstream pressure of the stream flow or to an exhaust outlet at the downstream end of the valve.

4. A valve comprising a casing having a stream line contour without and within and but slightly larger in diameter than the pipe line for which it is made to control, a cylinder within the casing with longitudinal ribs to space it from the walls to make an annular stream passage through the valve, reciprocable heads having oppositely disposed stream line contour faces in the opposite ends of the cylinder, mechanism within the cylinder and connecting said heads for mutual operations in opposite directions, a fluid pressure control means for said cylinder having a control valve and its control passages located in one of said longitudinal ribs, all constructed and arranged to form an automatic pressure operated valve in compact form.

5. A valve comprising a casting to include the casing with aligned inlet and outlet ports, an interior coaxial cylinder spaced from the casing and connected by integral longitudinal ribs, one of said ribs having a radial opening at about the center of the casing and extending from the cylinder through the casing for a control valve cock and also having a small longitudinal passage for by-passing the valve seat at the downstream end of the valve and with an inlet port facing the upstream end, a control cock seated in said radial opening and having a right angle passage operable as a Pitot tube to admit pressure to said cylinder or exhaust it, and a reciprocable head in one end of the cylinder to act as a valve closure and pressure operable mechanism within said cylinder and connected to said head, and a valve seat for said head at the downstream end of the valve.

6. A valve comprising integral coaxial cylindrical members joined by longitudinal spacing webs all in one casting, the outer member serving as the valve casing and the inner as a pressure cylinder, a radial opening through one of said webs to serve as the seat for a control cock, said opening having transverse ports, one facing the upstream side of the valve and the other connecting a by-pass through the web around a valve seat at the downstream side of the valve, a control cock in said opening having a right angle passage to connect said cylinder interior with upstream side of the valve through one of said transverse ports as a Pitot tube high pressure connection or to the other of said ports as an exhaust low pressure connection, oppositely arranged tapered piston heads in the ends of said cylinder arranged for easy reciprocable movements, transversely arranged fulcrum means in said cylinder intermediate the piston heads, rocking lever means on said fulcrum means with opposite ends connected to said piston heads to cause the latter to have mutual movements in opposite directions for opening and closing the valve according to the setting of the control cock.

7. A valve comprising integral coaxial cylindrical members joined by longitudinal spacing webs all in one casting, the outer member serving as the valve casing and the inner as a pressure cylinder, a radial opening through one of said webs to serve as the seat for a control cock, said opening having transverse ports, one facing the upstream side of the valve and the other connecting a by-pass through the web around a valve seat at the downstream side of the valve, a control cock in said opening having a right angle passage to connect said cylinder interior with the upstream side of the valve through one of said transverse ports as a Pitot tube high pressure connection or to the other of said ports as an exhaust low pressure connection, oppositely arranged tapered piston heads in the ends of said cylinder arranged for easy reciprocable movements, transversely arranged fulcrum means in said cylinder intermediate the piston heads, rocking lever means on said fulcrum means with opposite ends connected to said piston heads to cause the latter to have mutual movements in opposite directions for opening and closing the valve according to the setting of the control cock, and means operable from without the casing to rock said lever means for opening and closing said valve.

8. A valve comprising integral coaxial cylindrical members joined by longitudinal spacing webs all in one casting, the outer member serving as the valve casing and the inner as a pressure cylinder, a radial opening through one of said webs to serve as the seat for a control cock, said opening having transverse ports, one facing the upstream side of the valve and the other connecting a by-pass through the web around a valve seat at the downstream side of the valve, a control cock in said opening having a right angle passage to connect said cylinder interior with the upstream side of the valve through one of said transverse ports as a Pitot tube high pressure connection or to the other of said ports as an exhaust low pressure connection, oppositely arranged tapered piston heads in the ends of said cylinder arranged for easy reciprocable movements, transversely arranged fulcrum means in said cylinder intermediate the piston heads, rocking lever means on said fulcrum means with opposite ends connected to said piston heads to cause the latter to have mutual movements in opposite directions for opening and closing the valve according to the setting of the control cock, and mechanical means operable from without the casing to rock said lever means only when said control cock is set to exclude pressure from the stream flow to the interior of the pressure cylinder.

9. An automatic pressure operable valve having a pressure cylinder with reciprocable piston heads and means to operate them for opening and closing the valve, a valve seat with which one of said piston heads mates to make a tight closure, the other piston head being always free to move after the first piston head has made contact with its valve seat, mechanical connections between said piston heads to cause mutual movements in opposite directions, all constructed and arranged for the forces tending to move either piston head to closed position to be finally applied on that one in contact with the valve seat to tighten its sealing pressure.

10. A packless valve comprising a casing having aligned inlet and outlet ports, a pressure cylinder within the casing having outwardly tapered piston heads mechanically connected for opposite axial movements, a valve seat at the outlet port for making a tight closure with one of the piston heads, pressure inlet and outlet ports from the stream line flow passage to said pressure cylinder, a small cock valve having a ground seat adjacent the outer wall of the valve casing for controlling all said pressure inlet and outlet ports for the cylinder, the stem of said cock valve being operable from without the casing for permitting angular movement of the cock valve whereby the control may be set independently of the size or pressures within the casing, by small angular movements of the cock alone for the complete normal movements of the piston heads under stream line pressure to open or close the main valve.

11. A valve comprising a casing and a spaced pressure cylinder in coaxial alignment, oppositely tapered piston heads in the cylinder, mechanical means connecting the piston heads so the movement of one forces the movement of the other in the opposite direction, said cylinder having only a single radial opening through its walls for communicating with passages in the casing leading to relatively high and low pressure regions in the stream flow passage through the casing and a control cock located adjacent the outer wall of the valve casing with ports to control which of said pressure regions shall dominate the pressure in the cylinder, the stem of said control cock being operable from without the casing.

12. A pressure operable valve comprising a casing and a pressure cylinder, piston heads in the ends of said cylinder, a pivoted rocker arm in the cylinder with each end connected to one of the piston heads adjacent the cylinder wall whereby the movement of one head will rock the arm and thereby move the other head in the opposite direction, means to apply pressure within said cylinder to operate the pistons while the latter are exteriorly subjected to the pressures of the stream line flow.

13. An automatic valve operable from the pressure of its controlled stream flow comprising a casing having aligned ports, a coaxial pressure cylinder having oppositely arranged and movable tapered plunger heads, each adapted for cooperation with its adjacent port to diminish or increase the flow, mechanism in the pressure cylinder to constrain the movements of the plunger heads in opposite directions, a control passage through the valve for a partial flow, means controlled from without the casing to divert a pressure effect of said partial flow to and from said pressure cylinder, said control passage being arranged for the movement of at least one of said plunger heads to automatically diminish or increase its potential flow as said head moves toward and from its adjacent port and independently of the before mentioned means controlled from without the casing.

14. An automatic pressure operable valve having a pressure cylinder with reciprocable piston heads and means to operate them for opening and closing the valve, a valve seat with which one of said piston heads mates to make a tight closure, the other piston head being always free to move after the first piston head has made contact with its valve seat, mechanical connections between said piston heads to cause mutual movements in opposite directions, said operating means including a passage through the valve for a partial flow and control means for the latter to apply its pressure effect in the pressure cylinder to affect the operation of the piston heads, said partial flow passage being located so as to have its potential flow progressively diminished or increased by the automatic movements of at least one of said piston heads.

15. A pipe valve comprising mechanism operable by pressure at either side of the valve, means movable by said mechanism to vary the opening through the valve, means to admit pipe line pressure to operate said mechanism from either side of the valve, means to apply said pressure arranged to function automatically under the sole control of the pipe line pressure, said last mentioned means including a passage for a partial flow through the valve, the pressure effect of which may be progressively increased or diminished and applied to said mechanism by the movement of the mechanism itself.

16. A pipe valve comprising mechanism operable by pressure at either side of the valve, means movable by said mechanism to vary the opening through the valve, means to admit pipe line pressure to operate said mechanism from either side of the valve, means to apply said pressure arranged to function automatically under the sole control of the pipe line pressure, said last mentioned means including a passage for a partial flow through the valve, the pressure effect of which may be progressively increased or diminished and applied to said mechanism by the movement of the mechanism itself as it respectively opens or closes the valve.

17. A pipe valve comprising mechanism operable by pressure at either side of the valve, means movable by said mechanism to vary the opening through the valve, means to admit pipe line pressure to operate said mechanism from either side of the valve, means to apply said pressure arranged to function automatically under the sole control of the pipe line pressure, said last mentioned means including a passage for a partial flow through the valve, the pressure effect of which may be progressively increased or diminished and applied to said mechanism by the movement of the mechanism itself as it respectively opens or closes the valve, all arranged for a degree of opening or closing movement of the valve dependent entirely upon the pressure conditions in the controlled stream line.

18. A stream line valve comprising a casing and two oppositely arranged tapered plungers in line with the stream flow and arranged to form the heads of a common pressure chamber around which the stream can flow to vary the pressure values on the exterior faces of the plungers in proportion to the velocity of the flow, mechanism connecting the plungers to cause them to move together but in opposite directions upon the movement of either one, means to establish a static pressure within said common pressure chamber from the forces of the flow or tendency to flow in the stream line, said means including an opening to the pressure chamber intermediate the ends of the plunger, a control for said opening whereby the latter may be put into communication with the forces of the flow on either the high pressure or low pressure sides of the valve to thereby determine which pressure region shall have the dominating effect on the static pressure within said pressure chamber, the whole valve mechanism being arranged as stated, to cause movement of said plungers by the unbalanced pressures on their interior and exterior faces, said plungers presenting a solid wall without openings therethrough for the pressure contact with the stream line flow.

19. In a valve of the general class described which comprises, a casing, a pressure cylinder having at its opposite ends two stream lined plunger heads each with a continuous unbroken tapered surface, one head pointed to the inlet and the other to the outlet port and positioned for the velocity of the stream flow or tendency to flow, to establish different pressure valves on the exterior surfaces of the plungers, means connecting the plungers to cause any movement of one to be followed by the movement of the other in an opposite direction, means to admit selectively any one of various pipe line pressures from different points in the main stream to the interior of the pressure cylinder, including a point between the plunger heads and a point beyond the outlet port, said means being selectively adjustable to various positions corresponding to a predetermined combined effect of the stream forces acting on said interlocked plungers with their interior surfaces subjected to one pressure value for both, and their exterior surfaces subjected to a different pressure value due to the main stream flow, or tendency to flow, past the said oppositely arranged piston heads.

In testimony whereof I have affixed my signature.

RUDOLPH WELCKER.